United States Patent
Maede et al.

(10) Patent No.: US 10,126,584 B2
(45) Date of Patent: Nov. 13, 2018

(54) LIQUID CRYSTAL DISPLAY DEVICE

(71) Applicant: Japan Display Inc., Minato-ku (JP)

(72) Inventors: Yuji Maede, Tokyo (JP); Jin Hirosawa, Tokyo (JP); Hidemasa Yamaguchi, Tokyo (JP)

(73) Assignee: Japan Display Inc., Minato-Ku (JP)

( * ) Notice: Subject to any disclaimer, the term of this patent is extended or adjusted under 35 U.S.C. 154(b) by 6 days.

(21) Appl. No.: 15/204,480

(22) Filed: Jul. 7, 2016

(65) Prior Publication Data
US 2017/0023816 A1    Jan. 26, 2017

(30) Foreign Application Priority Data

Jul. 22, 2015  (JP) ................. 2015-145085

(51) Int. Cl.
| G02F 1/1333 | (2006.01) |
| G02F 1/1335 | (2006.01) |
| G02F 1/1339 | (2006.01) |
| G02F 1/133 | (2006.01) |
| G02F 1/1368 | (2006.01) |
| G02F 1/1343 | (2006.01) |
| G06F 3/041 | (2006.01) |
| G06F 3/044 | (2006.01) |
| G02F 1/1362 | (2006.01) |

(52) U.S. Cl.
CPC ........ *G02F 1/13338* (2013.01); *G02F 1/1368* (2013.01); *G02F 1/13306* (2013.01); *G02F 1/13394* (2013.01); *G02F 1/133345* (2013.01); *G02F 1/133512* (2013.01); *G02F 1/134309* (2013.01); *G06F 3/044* (2013.01); *G06F 3/0412* (2013.01); *G06F 3/0416* (2013.01); *G02F 2001/134372* (2013.01); *G02F 2001/136218* (2013.01); *G02F 2201/121* (2013.01); *G02F 2201/123* (2013.01)

(58) Field of Classification Search
CPC .................................................. G02F 1/13338
See application file for complete search history.

(56) References Cited

U.S. PATENT DOCUMENTS

| 7,280,176 B2 | 10/2007 | Yuh et al. | |
| 2011/0109857 A1* | 5/2011 | Imanishi | G02F 1/133723 349/129 |
| 2012/0327338 A1* | 12/2012 | Kobayashi | G02F 1/133512 349/106 |
| 2014/0192019 A1 | 7/2014 | Fukushima | |
| 2016/0266450 A1* | 9/2016 | Kim | G02F 1/133514 |

FOREIGN PATENT DOCUMENTS

JP    2014-149816    8/2014

* cited by examiner

*Primary Examiner* — Edmond Lau
(74) *Attorney, Agent, or Firm* — Oblon, McClelland, Maier & Neustadt, L.L.P.

(57) ABSTRACT

According to one embodiment, a liquid crystal display device includes a first substrate, a second substrate and a liquid crystal layer. The first substrate includes a metal layer formed on an interlayer insulating film, arranged in contact with at least one of common electrodes adjacent to each other via a slit, and covering at least a part of the slit. The metal layer is at least partly opposed to a signal line located in correspondence with the slit and is arranged closer than the signal line to a liquid crystal layer.

14 Claims, 11 Drawing Sheets

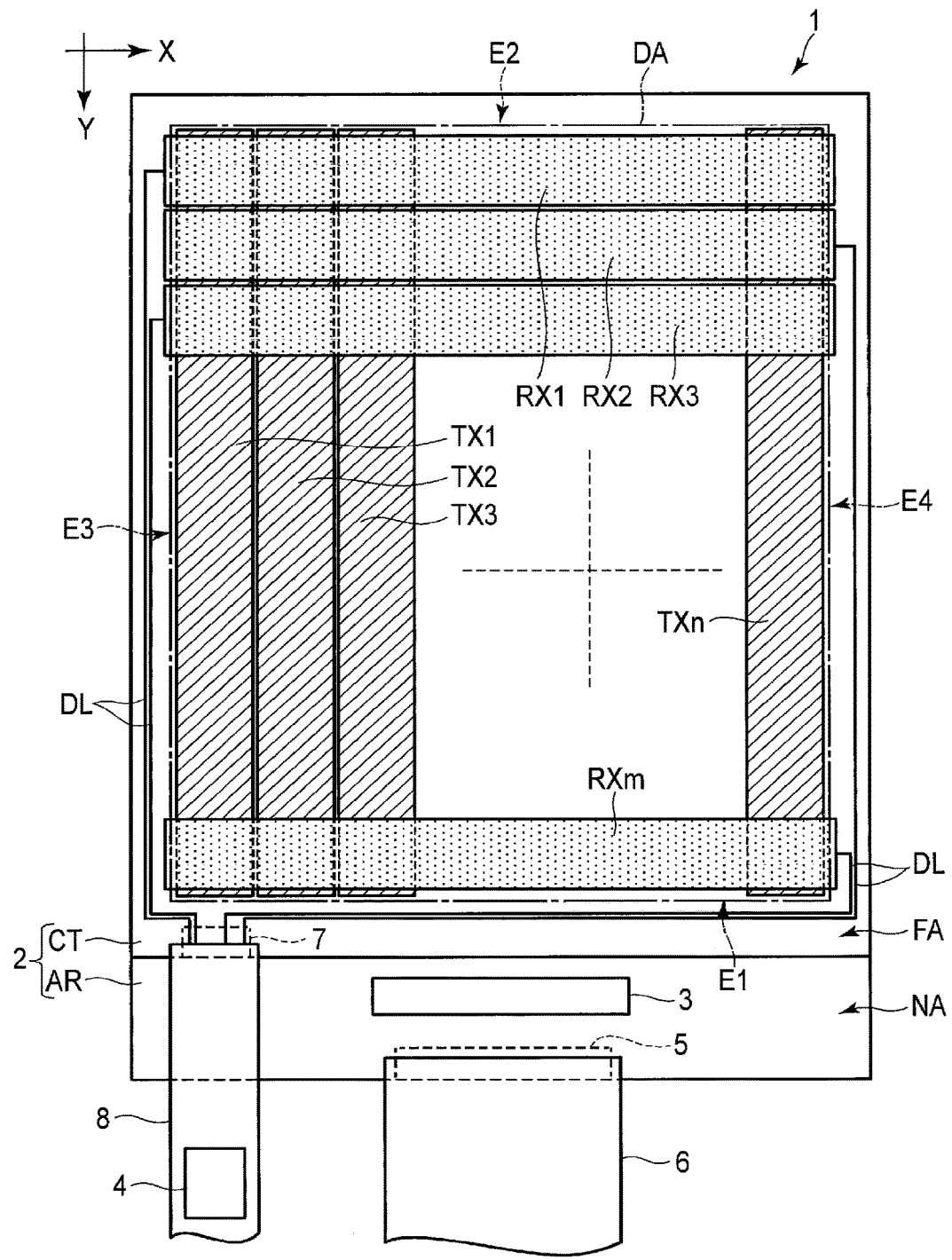
F I G. 1

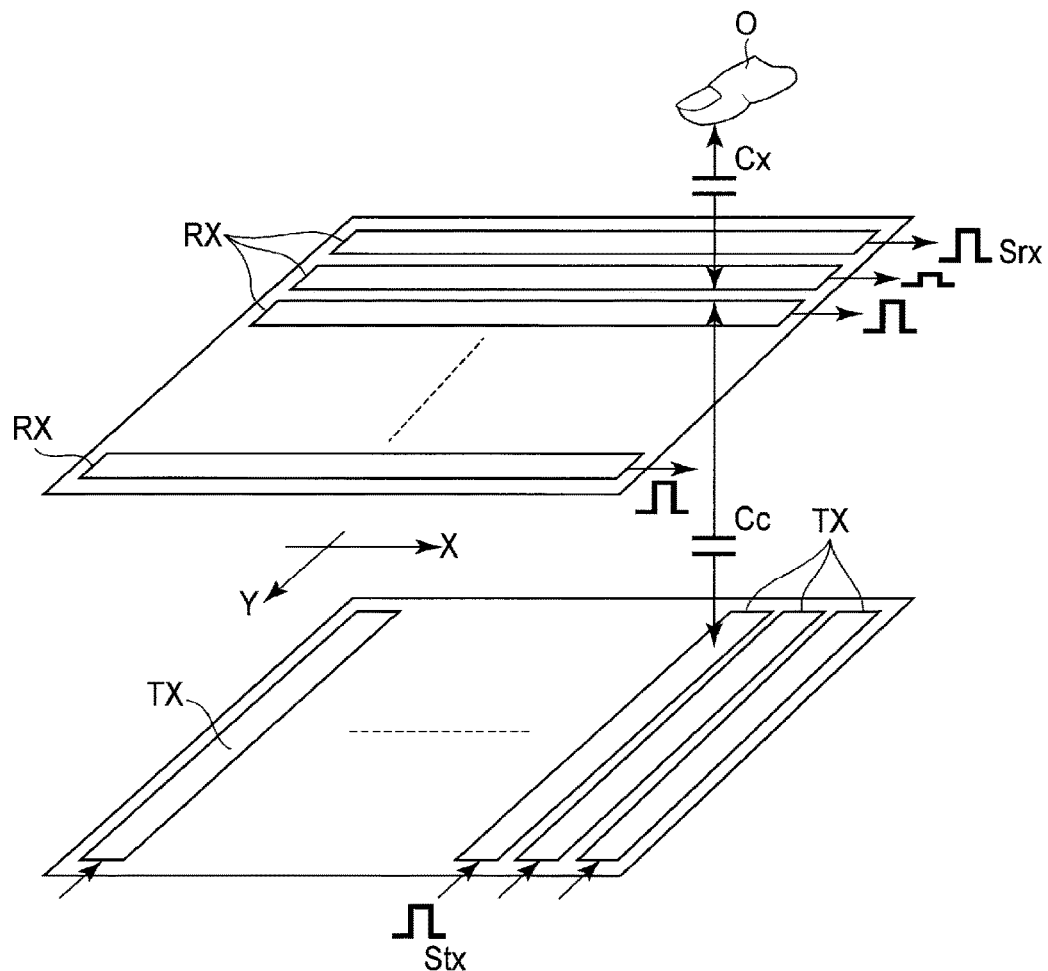
F I G. 2

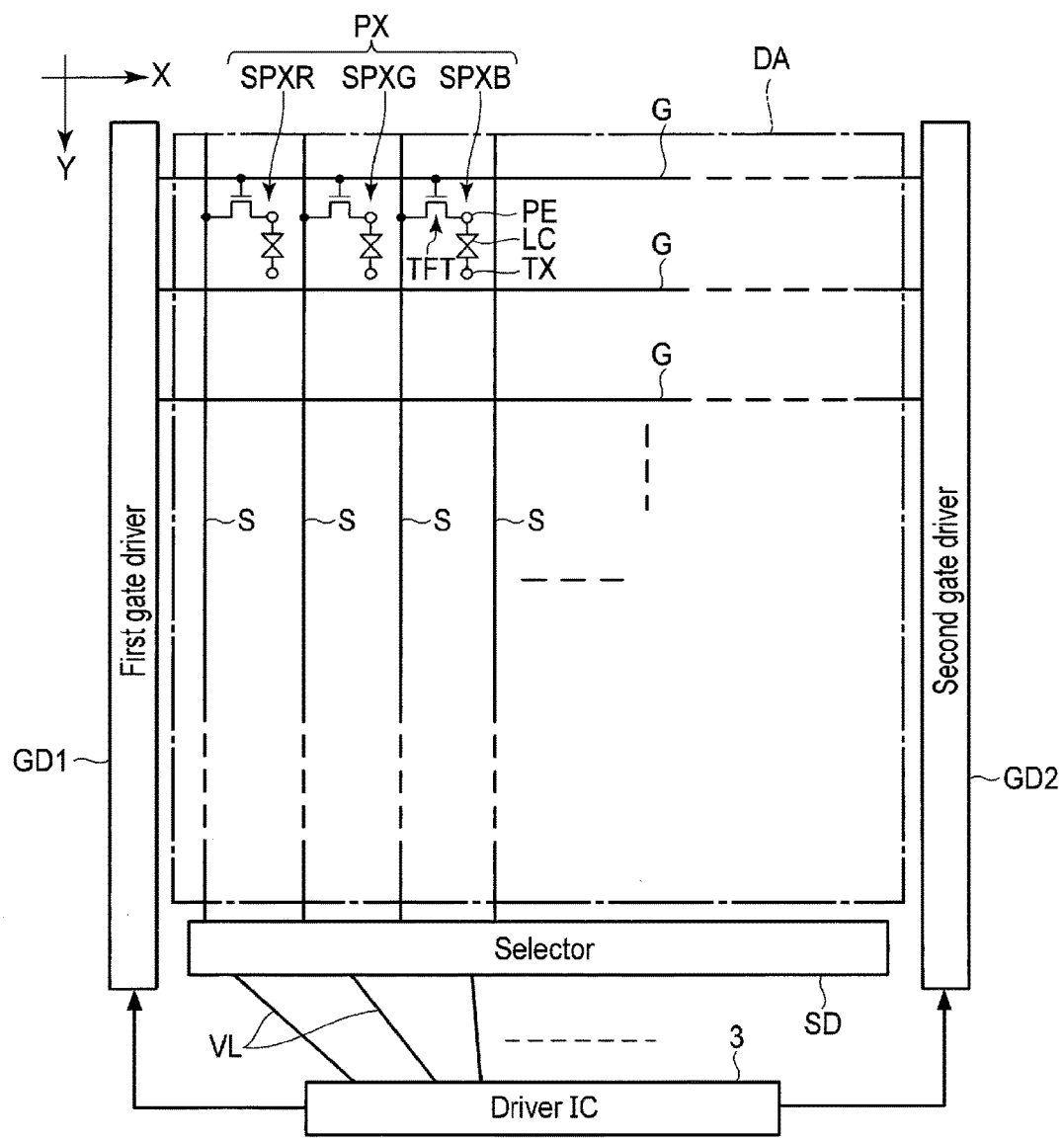
F I G. 3

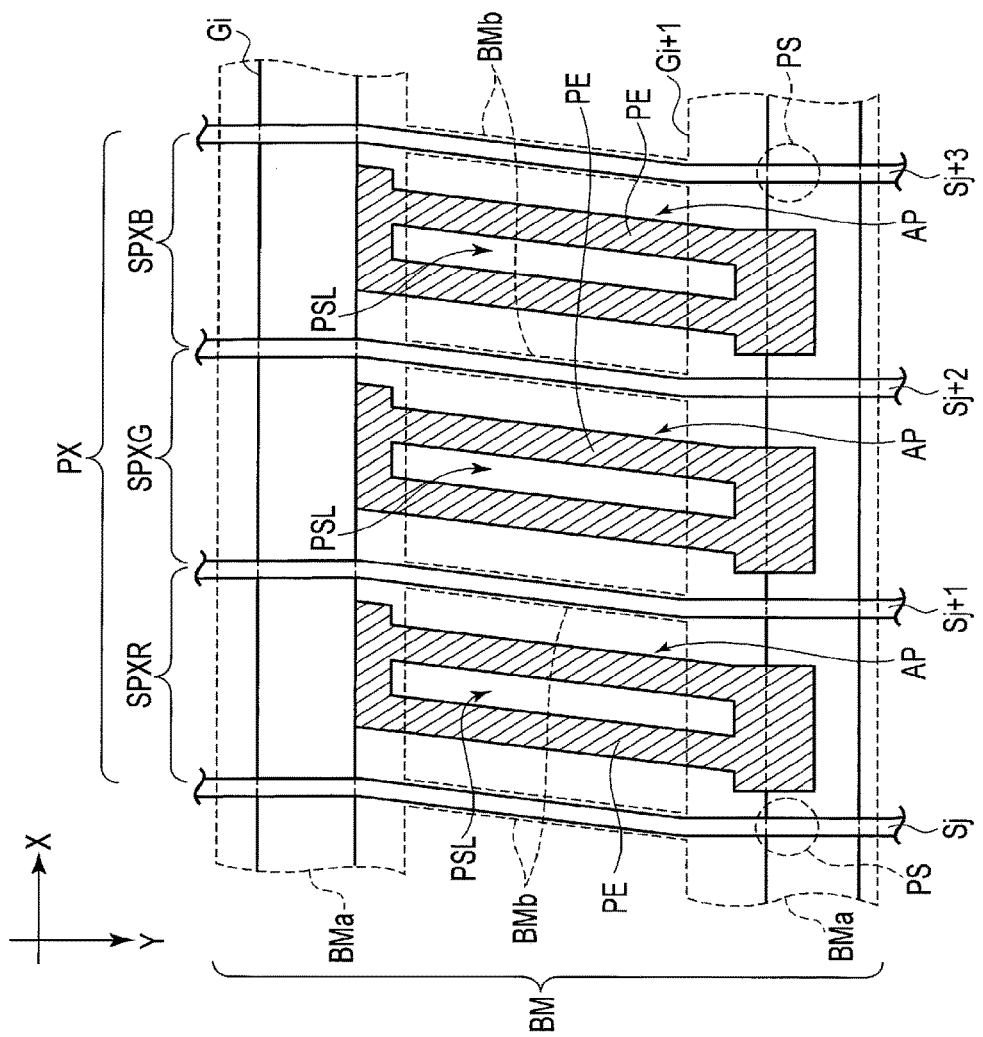
F I G. 4

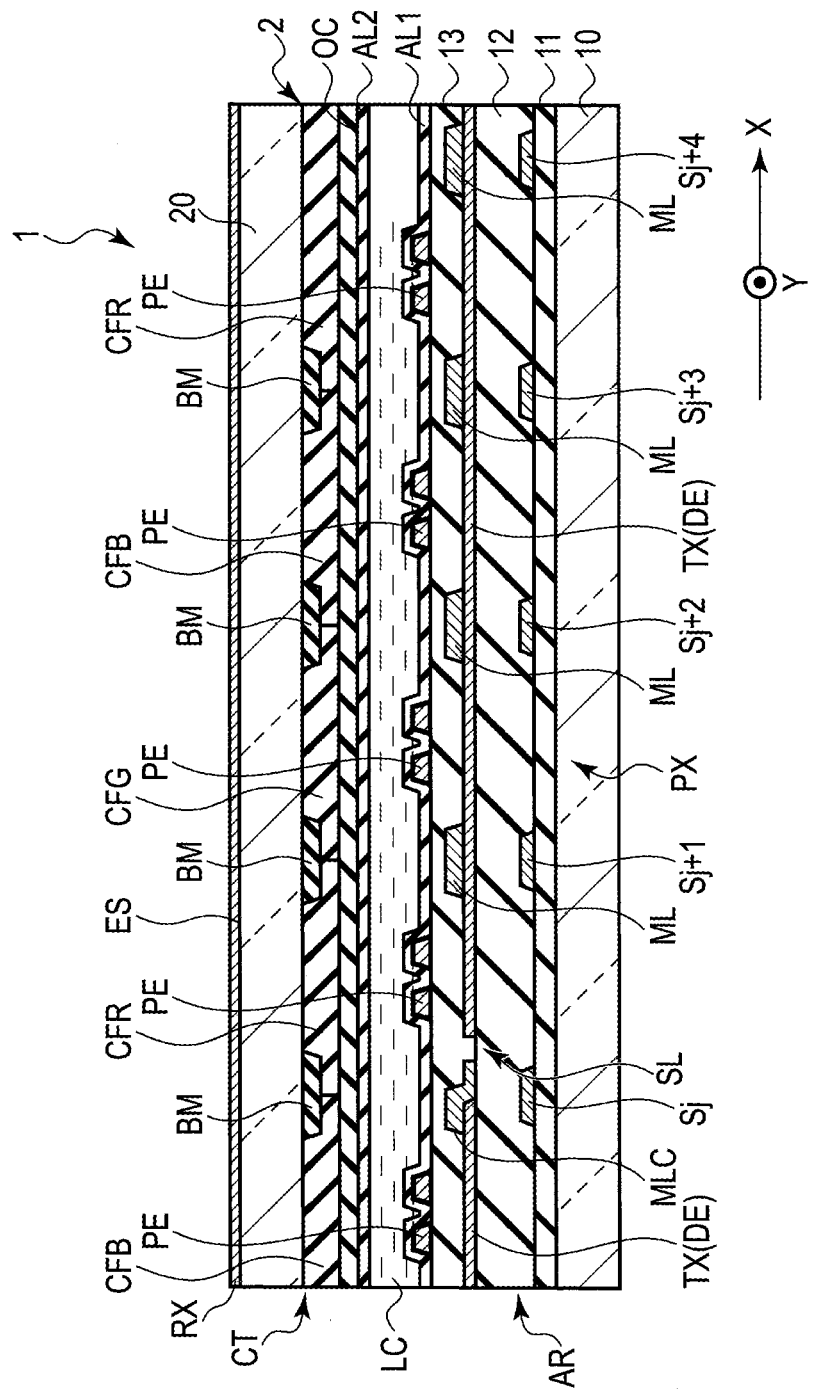
F I G. 6

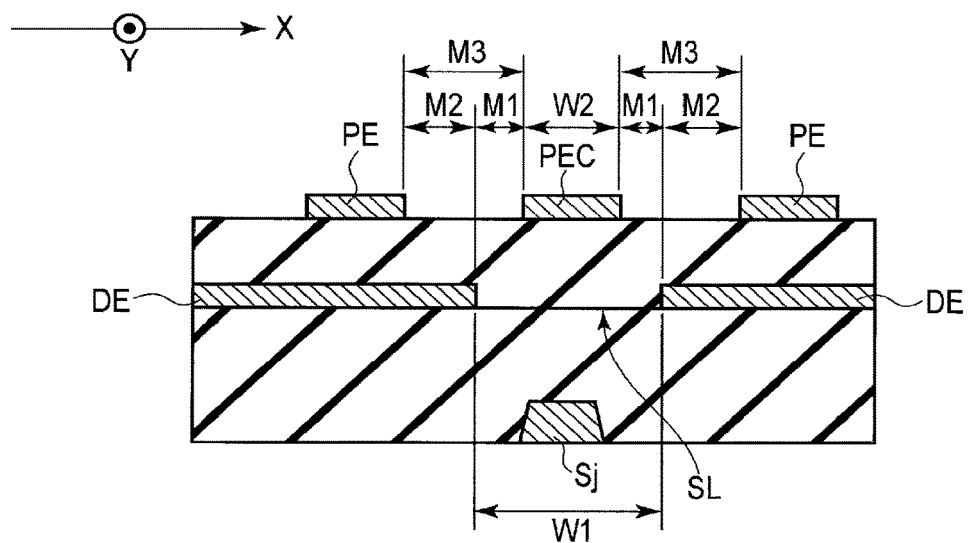
F I G. 8

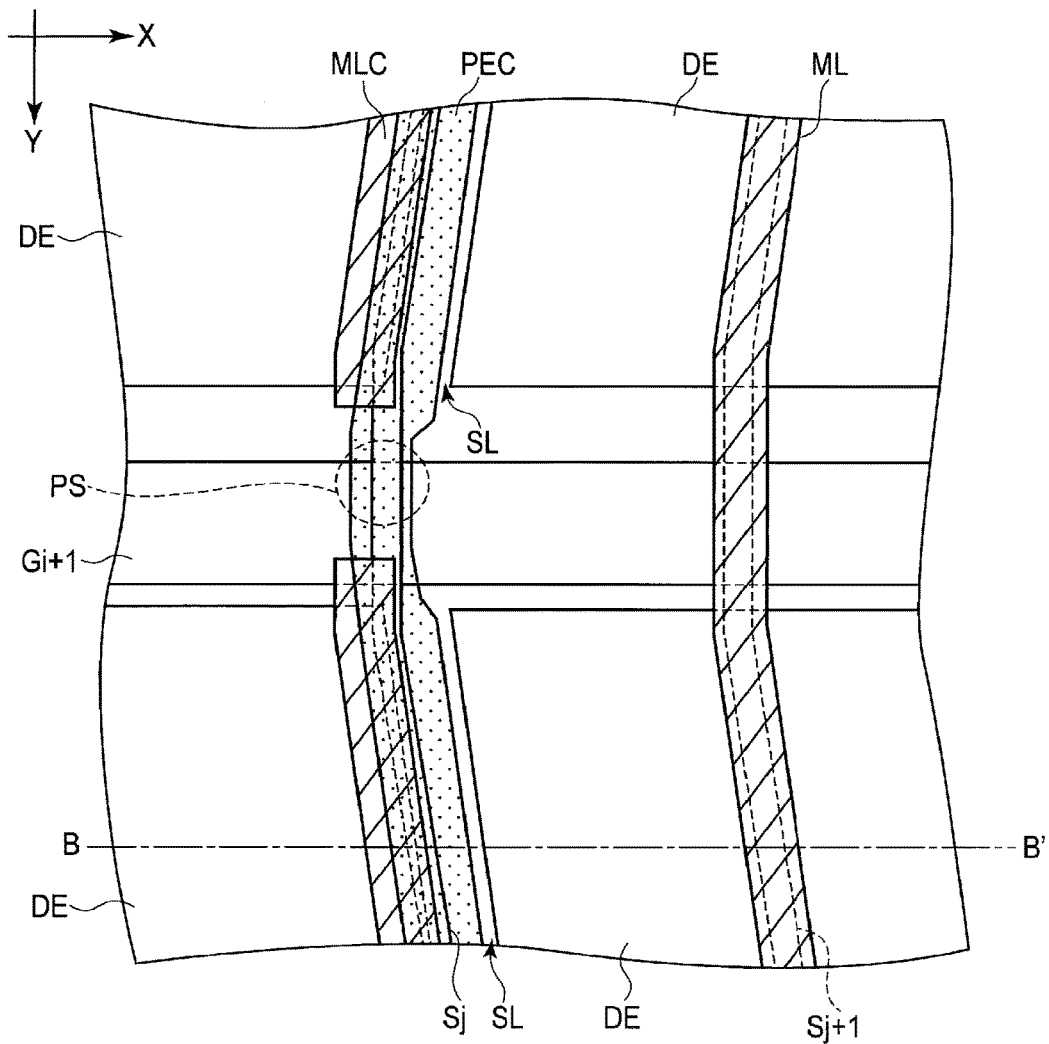
F I G. 9

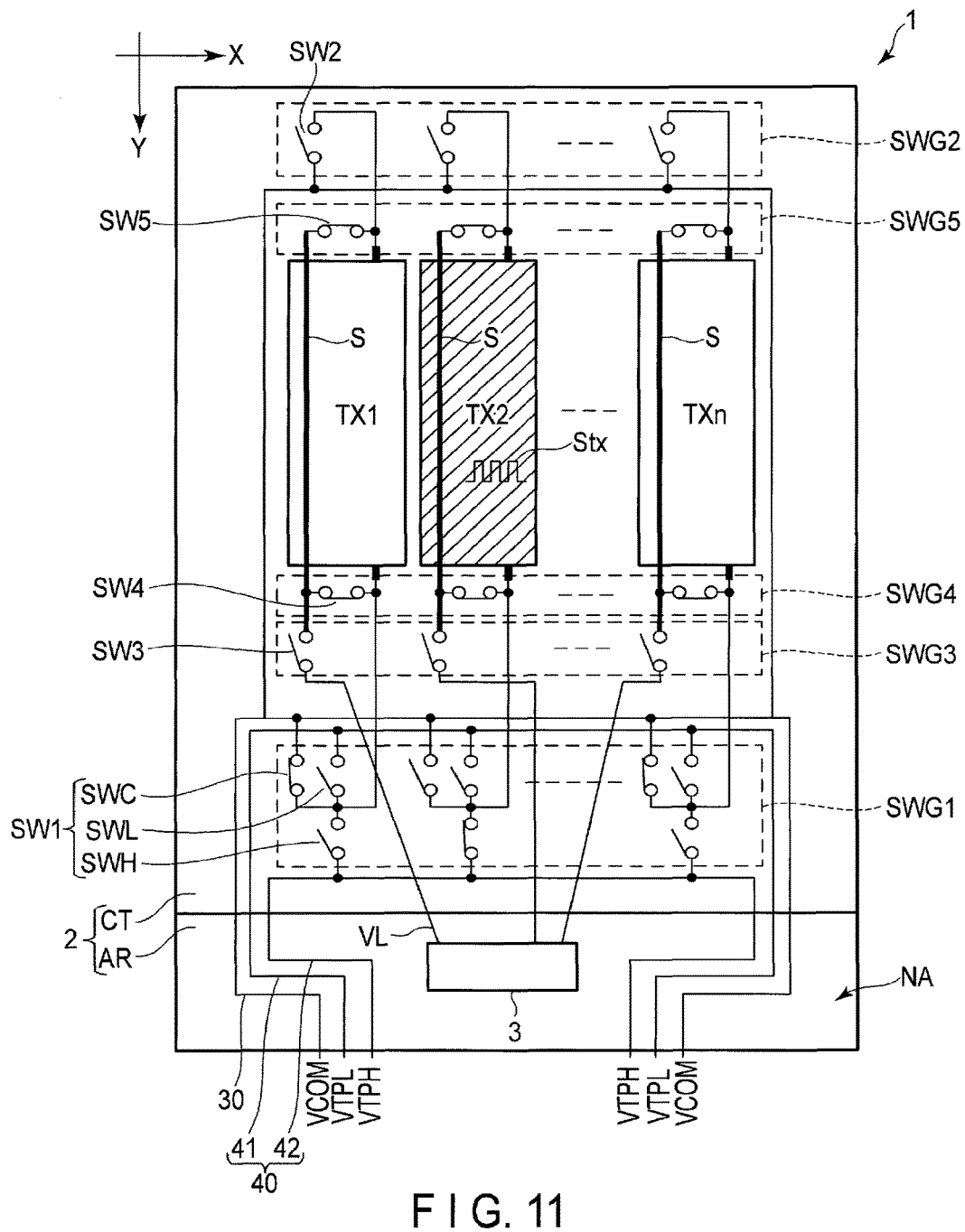
F I G. 11

LIQUID CRYSTAL DISPLAY DEVICE

CROSS-REFERENCE TO RELATED APPLICATIONS

This application is based upon and claims the benefit of priority from Japanese Patent Application No. 2015-145085, filed Jul. 22, 2015, the entire contents of which are incorporated herein by reference.

FIELD

Embodiments described herein relate generally to a liquid crystal display device.

BACKGROUND

Currently, flat-panel display devices are being actively developed, and among them, liquid crystal display devices are attracting attention because of their advantages such as lightness, slimness and low energy consumption. In active-matrix liquid crystal display devices, where a switching element is incorporated into each pixel, a structure where a pixel electrode and a common electrode are provided in an array substrate and are opposed to each other via an insulating film is gaining attention.

In general, the common electrode is divided into a plurality of electrodes. It is possible to divide the common electrode into a plurality of electrodes by, for example, forming a slit which constitutes the boundary of adjacent common electrodes along a signal line which supplies an image signal to the pixel.

However, in the case of forming the above-described slit, an electric field is produced between the signal line and the pixel electrode in proximity to the slit, and part of the electric field may leak into a liquid crystal layer. The electric field leaking into the liquid crystal layer causes problems such as a crosstalk and a streak on a screen and degrades the display quality of the liquid crystal display device.

BRIEF DESCRIPTION OF THE DRAWINGS

FIG. 1 is a schematic plan view of the structure of a liquid crystal display device of a first embodiment.

FIG. 2 shows an example of the principle of detecting an object in contact with or in proximity to a display area.

FIG. 3 is a schematic diagram showing an equivalent circuit related to image display in the liquid crystal display device of the first embodiment.

FIG. 4 is a schematic plan view of a single pixel consisting of three sub-pixels formed in an array substrate as viewed from a counter-substrate side in the liquid crystal display device of the first embodiment.

FIG. 6 is a sectional diagram showing a part of the liquid crystal device along line A-A' of FIG. 5.

FIG. 8 is an enlarged view of a part of the sectional diagram of FIG. 7.

FIG. 9 is a schematic plan view of a number of sub-pixels formed in an array substrate as viewed from a counter-substrate side in a liquid crystal display device of a second embodiment.

FIG. 11 shows a state of each switch group of a liquid crystal display device of a third embodiment in a touch detection period.

DETAILED DESCRIPTION

Figure 5:
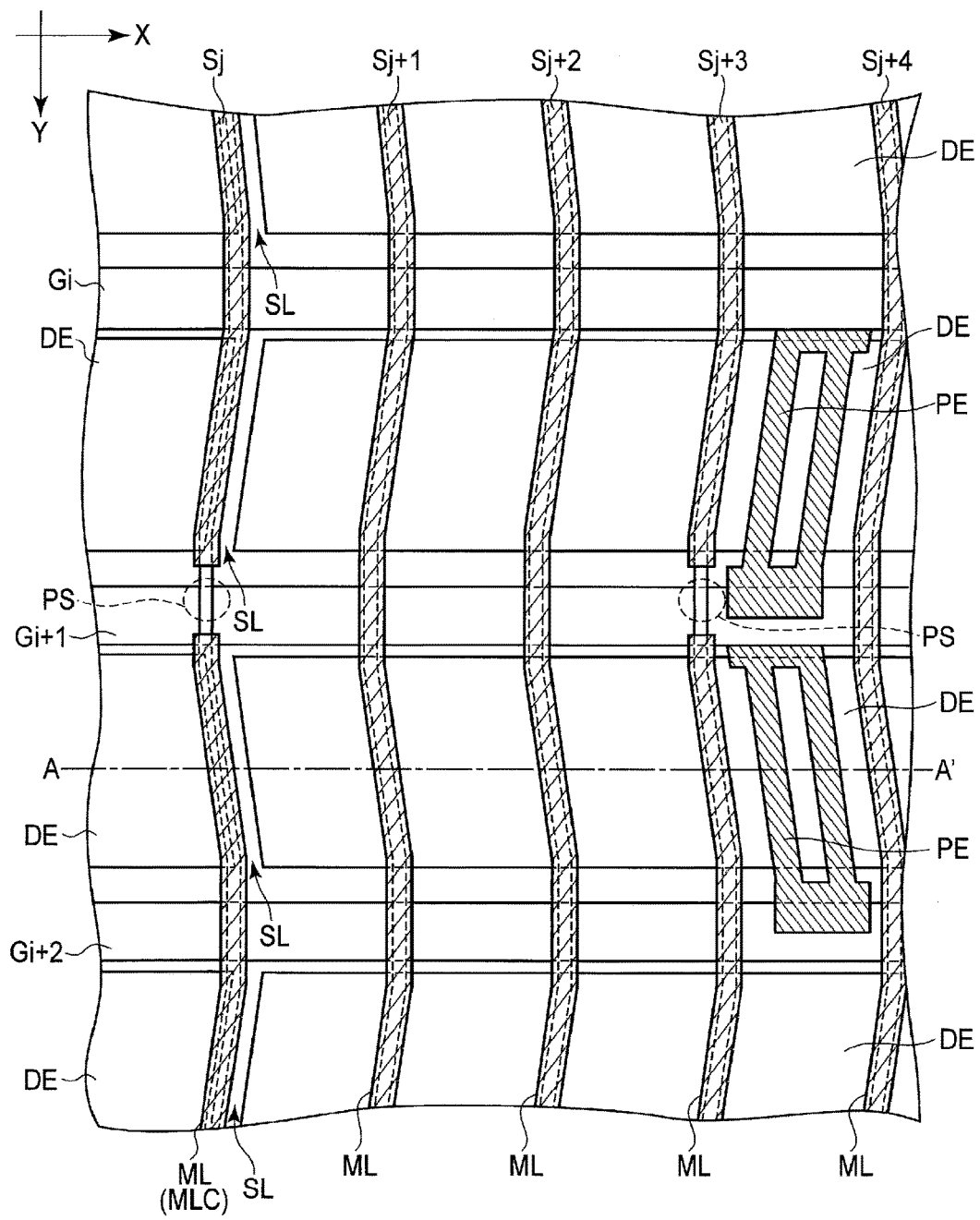
FIG. 5 is a schematic plan view of a number of sub-pixels formed in the array substrate as viewed from the counter-substrate side in the liquid crystal display device of the first embodiment.

In general, according to one embodiment, a liquid crystal display device includes a first substrate, a second substrate and a liquid crystal layer. The first substrate includes a plurality of signal lines, an interlayer insulating film covering the signal lines, and a plurality of common electrodes formed on the interlayer insulating film and divided from each other by slits formed along the signal lines. The second substrate is opposed to the first substrate. The liquid crystal layer is enclosed between the first substrate and the second substrate. The first substrate includes a metal layer formed on the interlayer insulating film, arranged in contact with at least one of the common electrodes adjacent to each other via the slit, and covering at least a part of the slit. The metal layer is at least partly opposed to the signal line located in correspondence with the slit and is arranged closer than the signal line to the liquid crystal layer.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, structural elements are schematically illustrated in the drawings as compared to the actual modes. However, such schematic illustration is merely exemplary, and adds no restrictions to the interpretation of the invention. In the drawings, reference numbers of continuously arranged elements equivalent or similar to each other are omitted in some cases. In addition, in the specification and drawings, structural elements which function in the same as or a similar manner to those described in connection with preceding drawings are denoted by like reference numbers, and detailed descriptions thereof are omitted unless otherwise necessary.

In each embodiment, a display device comprising a display panel using a liquid crystal display element and configured to perform a touch detection function will be described as an example of a display device. However, each embodiment does not preclude application of individual technical idea disclosed in the embodiment to display devices using display elements other than the liquid crystal display element. Here, the display elements other than the liquid crystal display element include a self-luminous display panel comprising an organic electroluminescent display element, etc., an electronic-paper type display panel comprising a cataphoretic element, etc., and the like.

First Embodiment

FIG. 1 is a schematic plan view of the structure of the liquid crystal display of the first embodiment. A liquid crystal display device 1 can be used in various devices such as smartphones, tablet computers, feature phones, personal computers, television receivers, in-car devices, and game consoles.

The liquid crystal display device 1 includes a liquid crystal display panel 2, a plurality of drive electrodes TX (TX1 to TXn), a plurality of detection electrodes RX (RX1 to RXm) opposed to the respective drive electrodes TX, a driver IC 3 functioning as a driver module, and a touch detection IC 4 functioning as a detection module. For example, n and m are integers greater than or equal to two. The drive electrodes may also be referred to as common electrodes.

The liquid crystal display panel 2 includes a rectangular array substrate AR (first substrate) and a rectangular counter-substrate CT (second substrate) smaller in size than the array substrate AR. In the example of FIG. 1, the array substrate AR and the counter-substrate CT are attached to each other such that three sides of one substrate are neatly laid on three sides of the other substrate. The array substrate AR includes a terminal area NA (unopposed area) where the array substrate AR is not opposed to the counter-substrate CT.

In an area where the array substrate AR and the counter-substrate CT are opposed to each other, the liquid crystal display panel 2 includes a display area (active area) DA serving for image display and a peripheral area FA located between the display area DA and the edges of the liquid crystal display panel 2. In the example of FIG. 1, the display area DA is a rectangle including a first side E1 at the terminal area NA side, a second side E2 opposite to the first side E1, and a third side E3 and a fourth side E4 connecting the first side E1 and the second side E2 respectively. In the following description, a direction parallel to the first side E1 and the second side E2 will be referred to as a first direction X, and a direction parallel to the third side E3 and the fourth side E4 will be referred to as a second direction Y. In the present embodiment, the first direction X and the second direction Y cross each other orthogonally. However, the first direction X and the second direction Y may also cross each other at other angles.

In the display area DA, the drive electrodes TX1 to TXn extend from the first side E1 up to the second side E2 in the second direction Y, and are arranged in the first direction X. The drive electrodes TX1 to TXn can be formed of a transparent conductive film of, for example, indium tin oxide (ITO). The drive electrodes TX1 to TXn are formed, for example, inside the display panel 2, more specifically, in the array substrate AR.

In the display area DA, the detection electrodes RX1 to RXm extend from the third side E3 up to the fourth side E4 in the first direction X, and are arranged in the second direction Y. The detection electrodes RX1 to RXm can be formed of a transparent conductive film of ITO, etc., or a conductive pattern of a metal line. The detection electrodes RX1 to RXm are formed, for example, on a surface of the counter-substrate CT, which is opposite to a surface opposed to the array substrate AR.

The driver IC 3 executes image display control and is mounted in the terminal area NA. The driver IC 3 is mounted therein by a Chip-on-Glass (COG) method but may also be mounted on a first flexible printed circuit 6.

In the terminal area NA, a mounting terminal 5 is formed. To the mounting terminal 5, the first flexible printed circuit 6 which supplies image data to the liquid crystal display panel 2 is connected.

A mounting terminal 7 is formed at an edge of the counter-substrate CT located along the terminal area NA. To the mounting terminal 7, a second flexible printed circuit 8 which outputs detection signals from the detection electrodes RX1 to RXm is connected. In the example of FIG. 1, the touch detection IC 4 is mounted on the second flexible printed circuit 8.

The detection electrodes RX1 to RXm are, for example, connected to the mounting terminal 7 via detection lines DL formed on the surface of the counter-substrate CT in the peripheral area FA.

Next, an example of the principle of detecting an object in contact with or in proximity to the display area DA by the drive electrodes TX and the detection electrodes RX will be described with reference to FIG. 2.

There is capacitance Cc between the drive electrode TX and the detection electrode RX which are opposed to each other. When a drive signal Stx is supplied to the drive electrode TX, an electric current flows through the detection electrode RX via capacitance Cc, and thus a detection signal Srx is obtained from the detection electrode RX. The drive signal Stx is, for example, a rectangular pulse signal, and the detection signal Srx is a rectangular pulse signal of the voltage corresponding to the drive signal Stx.

When an object O, which is a conductor such as a user's finger, approaches the liquid crystal display device 1, capacitance Cx is produced between the object O and the detection electrode RX in proximity to the object O. When the drive signal Stx is supplied to the drive electrode TX, the waveform of the detection signal Srx obtained from the detection electrode RX in proximity to the object O changes under the influence of the capacitance Cx. That is, the touch detection IC 4 can detect the object O in contact with or in proximity to the display device 1 based on the detection signals Srx obtained from the respective detection electrodes RX. In addition, the touch detection IC 4 can detect the position of the object O in the first direction X and the second direction Y based on the detection signals Srx obtained from the respective detection electrodes RX in the respective time phases where the drive signal Stx is sequentially supplied to the respective drive electrodes TX in a time-division manner. The above-described method is referred to as a mutual-capacitive method or a mutual-detection method.

Next, the image display by the liquid crystal display device 1 will be described. FIG. 3 is a schematic diagram showing an equivalent circuit related to image display. The liquid crystal display device 1 includes a plurality of gate lines (scan lines) G, a plurality of source lines (signal lines) S crossing the gate lines C, a first gate driver GD1, a second gate driver GD2, and a selector (an RGB switch) SD. The selector SD is connected to the driver IC 3 via a plurality of video lines VL.

In the display area DA, the gate lines G extend in the first direction X and are arranged in the second direction Y. In the display area DA, the source lines S extend in the second direction Y and are arranged in the first direction X. The gate lines G and the source lines S are formed in the array substrate AR. Each gate line G is connected to the first gate driver GD1 and the second gate driver GD2. Each source line S is connected to the selector SD.

In the example of FIG. 3, an area defined by the gate lines G and the source lines S corresponds to a single sub-pixel SPX. For example, in the present embodiment, a sub-pixel SPXR corresponding to red, a sub-pixel SPXG corresponding to green and a sub-pixel SPXB corresponding to blue constitutes a single pixel PX. The pixel PX may further include a sub-pixel SPXW corresponding to white, etc.

Each sub-pixel SPX includes a thin-film transistor TFT (switching element) formed in the array substrate AR. The thin-film transistor TFT is electrically connected to the gate line G, the source line S, and a pixel electrode PE. In image display, the drive electrode TX is set at a common potential and functions as the so-called common electrode.

The first gate driver GD1 and the second gate driver GD2 sequentially supply scan signals to the respective gate lines. The selector SD selectively supplies an image signal to the respective source lines S under the control of the driver IC 3. When a scan signal is supplied to the gate line G connected to a certain thin-film transistor TFT and an image signal is supplied to the source line S connected to the thin-film transistor TFT, the voltage corresponding to the image signal is applied to the pixel electrode PE. At this time, the alignment of liquid crystal molecules of the liquid crystal layer LC enclosed between the array substrate AR and the counter-substrate CT changes from an initial alignment state of not being subjected to the voltage, by an electric field produced between the pixel electrode PE and the drive electrode TX. An image is displayed in the display area DA through the above-described operation process.

FIG. 4 is a schematic plan view of a single pixel PX consisting of three sub-pixels SPXR, SPXG and SPXB formed in the array substrate AR consecutively in the first direction X as viewed from a counter-substrate CT side. The sub-pixel SPXR is defined by two adjacent gate lines Gi and Gi+1 (i is a positive integer) and two adjacent source lines Sj and Sj+1 (j is a positive integer) and includes one pixel electrode PE inside. The sub-pixel SPXR is a pixel serving for red (R) display.

The sub-pixel SPXG is defined by two adjacent gate lines Gi and Gi+1 and adjacent source lines Sj+1 and Sj+2 and includes one pixel electrode PE inside. The sub-pixel SPXG is a pixel serving for green (G) display.

The sub-pixel SPXB is defined by adjacent two gate lines Gi and Gi+1 and adjacent source lines Sj+2 and Sj+3 and includes one pixel electrode PE inside. The sub-pixel SPXB is a pixel serving for blue (B) display. In the example of FIG. 4, each of the pixel electrodes provided respectively in the sub-pixels SPXR, SPXG and SPXB includes one slit PSL. The pixel electrode PE is formed of, for example, a transparent conductive film of ITO, etc.

In the example of FIG. 4, a black matrix BM (light-blocking layer) provided in the counter-substrate CT and opposed to the sub-pixels SPXR, SPXG and SPXB, and a columnar spacer PS (projecting through the liquid crystal layer LC) provided between the array substrate AR and the counter-substrate CT are shown by broken lines. The spacer PS is provided, for example, in the counter-substrate CT, and the front edge is in contact with the array substrate AR. The black matrix BM includes a first portion BMa overlapping the gate lines Gi and Gi+1 and extending in the first direction X. Further, the black matrix BM includes a second portion BMb overlapping the source lines Sj to Sj+3 and extending in the second direction Y. Both ends of the respective second portions BMb are connected to the respective first portions BMa, and apertures AP corresponding respectively to the sub-pixels SPXR, SPXG and SPXB are formed.

The spacer PS is provided at a position where the spacer PS overlaps the first portion BMa of the black matrix BM. In the example of FIG. 4, the spacers PS are provided at a position where the gate line Gi+1 and the source line Sj overlap each other and at a position where the gate line Gi+1 and the source line Sj+3 overlap each other, but the spacer PS may be provided at another position where the spacer PS overlaps the first portion BMa. Further, in the example of FIG. 4, one spacer PS is provided with respect to three sub-pixels SPXR, SPXG and SPXB, that is, with respect to one pixel PX. However, one spacer PS may be provided with respect to four or more sub-pixels SPX.

FIG. 5 is a schematic plan view of a number of sub-pixels SPX formed in the array substrate AR as viewed from the counter-substrate CT side.

FIG. 5 is a plan view of five source lines Sj, Sj+1, Sj+2, Sj+3 and Sj+4 extending windingly in the second direction Y and three gate lines Gi, Gi+1 and Gi+2 extending in the first direction X.

Here, between sub-pixels SPX formed between the gate lines Gi and Gi+1 and sub-pixels SPX formed between the gate line Gi+1 and Gi+2, there are differences mainly in the shape of the pixel electrode PE and the shape of the source line S. More specifically, the pixel electrode PE and the source line S between the gate lines Gi+1 and Gi+2 and the pixel electrode PE and the source line S between the gate lines Gi and Gi+1 are symmetrical with respect to a line in the first direction X. The pixel electrodes PE of two different shapes are arranged alternately in the second direction Y. Note that FIG. 5 only illustrates one pixel electrode PE formed between the gate lines Gi and Gi+1 and one pixel electrode PE formed between the gate lines Gi+1 and Gi+2 and omits other pixel electrodes PE.

The drive electrode TX shown in FIG. 1, etc. consists of a plurality of divisional electrodes formed of a transparent conductive film of ITO, etc. Each drive electrode DE is arranged across a predetermined number of sub-pixels SPX arranged in the first direction X and is opposed to the pixel electrode PE consisting of these sub-pixels SPX. In the example of FIG. 5, each divisional electrode DE is formed between adjacent gate lines G and extends in the first direction X in a belt-like manner. Note that, although FIG. 5 shows a divisional electrode DE extending across at least four or more sub-pixels SPX, the divisional electrode DE may be formed across the three sub-pixels SPXR, SPXG and SPXB constituting a single pixel electrode PX. Further, the divisional electrodes DE arranged in the second direction Y may not be formed separately but may be formed continuously at positions where the divisional electrodes DE overlap the gate lines G.

A slit SL is formed at the boundary of the divisional electrodes DE adjacent to each other in the first direction X. The slit SL extends along the source line S (source line Sj in FIG. 5) formed in proximity to the boundary of the divisional electrodes DE and has a constant width. For example, in planar view, the source line S overlaps the edge of one divisional electrode DE and does not overlap the other divisional electrode DE.

A metal layer ML (metal line) is formed along each of the source lines Sj to Sj+4. In planar view, the metal layer ML overlaps each of the source lines Sj to Sj+4 and extends windingly in the second direction Y in a manner similar to that of the source lines Sj to Sj+4. The metal layer ML is formed of a metal material such as molybdenum, tungsten, aluminum, titanium and copper, or an alloy containing such a metal material. The metal layer ML may have a single layer structure or may have a multi-layer structure. The metal layer ML electrically connects the divisional electrodes DE arranged in the second direction Y to each other. In this way, the divisional electrodes DE arranged in the second direction Y are set at the same potential as each other and thereby constitute the drive electrode TX extending in the second direction Y as shown in FIG. 1. Since the metal layer ML has a resistance lower than that of the transparent conductive film of ITO, etc., it is possible to reduce the resistance of the drive electrode TX by connecting the divisional electrodes DE to each other with the metal layer ML.

In the example of FIG. 5, the metal layer ML is not formed in a position where the front edge of the spacer PS formed in the counter-substrate CT is in contact with the array substrate AR (hereinafter referred to as a spacer grounding portion). The same also applies to other spacer grounding portions in the display area DA.

For example, the spacers PS have the same height. Therefore, if the metal layers ML are formed in some spacer grounding portions but not formed in the other spacer grounding portions in the display area DA, depending on whether the metal layer ML is formed in the spacer grounding portion or not, the cell gap will vary by the thickness of the metal layer ML. If the cell gap varies in this way, it is difficult to accurately determine the amount of liquid crystal dropped between the array substrate AR and the counter-substrate CT to form the liquid crystal layer LC.

On the other hand, in such a structure as the structure of the present embodiment where no metal layer ML is formed in any of the spacer grounding portions, it is possible to prevent variations of the cell gap associated with the metal layer ML. Therefore, it is possible to accurately determine the amount of liquid crystal to be dropped. Note that, in the case of adopting a structure where the metal layers ML are formed in all the spacer grounding portions, it is also possible to prevent variations of the cell gap associated with the metal layer ML and thereby achieve the same technical effect.

FIG. 6 is a sectional diagram showing a part of the liquid crystal device 1 along line A-A' of FIG. 5.

The array substrate AR and the counter-substrate CT are attached to each other with the above-described cell gap formed therebetween by the spacers PS. The liquid crystal layer LC is enclosed in the space created by the cell gap.

The array substrate AR includes a phototransmissive insulating substrate such as a glass substrate or a resin substrate, namely, a first insulating substrate 10. The array substrate AR includes the source lines S, the drive electrodes TX (divisional electrodes DE), the pixel electrodes PE, the metal layers ML, a first insulating film 11, a second insulating film 12, a third insulating film 13, a first alignment film AL1, etc., on a surface of the first insulating substrate 10 opposed to the counter-substrate CT.

The first insulating film 11 is formed on the surface of the first insulating substrate 10 opposed to the counter-substrate CT. The second insulating film 12 covers the source lines S and the first insulating film 11. The divisional electrodes DE are formed on the second insulating film 12.

On the divisional electrodes DE, the metal layers ML opposed to the respective source lines S are formed as described above. The third insulating film 13 covers the divisional electrodes DE, the metal layers ML, and the second insulating film 12 exposed from the slits SL. The pixel electrodes PE are formed on the third insulating film 13. The pixel electrodes PE are opposed to the divisional electrodes DE via the third insulating film 13. The first alignment film AL1 covers the pixel electrodes PE and the third insulating film 13.

On the other hand, the counter-substrate CT includes a phototransmissive insulating substrate such as a glass substrate or a resin substrate, namely, a second insulating substrate 20. The counter-substrate CT includes the black matrix BM, the color filters CFR, CFG and CFB, an overcoat layer OC, a second alignment film AL2, etc., on a surface of the second insulating substrate 20 opposed to the array substrate AR.

The black matrix BM and the color filters CFR, CFG and CFB are formed on the surface of the second insulating substrate 20 opposed to the array substrate AR. The boundaries of the color filters CFR, CFG and CFB overlap with the black matrix BM.

The overcoat layer OC covers the color filters CFR, CFG and CFB. The second alignment film AL2 covers the overcoat layer OC.

The detection electrodes RX are formed on the surface (outer surface ES) of the second insulating substrate 20.

A metal layer ML (hereinafter referred to as a metal layer MLC) in proximity to the boundary of two divisional electrodes DE adjacent to each other in the first direction X also extends in correspondence with the slit SL formed between these divisional electrodes DE and covers a part of the slit SL.

In the example of FIG. 6, the metal layer MLC covers the edge of one of the divisional electrodes DE adjacent to each other via the slit SL. Therefore, the metal layer MLC is in contact with the one divisional electrode DE but is not in contact with the other divisional electrode DE. Note that, in the example of FIG. 6, the slit SL is formed at the boundary between the divisional electrode DE opposed to the blue color filter CFB and the divisional electrode DE opposed to the red color filter CFR, and the metal layer MLC is in contact with the divisional electrode DE opposed to the blue color filter CFB. However, the metal layer MLC may also be in contact with the divisional electrode DE opposed to a different color filter. That is, for example, the metal layer MLC may be formed in the slit SL at the boundary of the divisional electrodes DE such that the metal layer MLC is in contact with the divisional electrode DE opposed to the blue color filter CFB in one slit SL and may be in contact with the divisional electrode DE opposed to the red color filter CFR in the next slit SL.

It is possible to provide the metal layer MLC in the slit SL while preventing a short circuit of the divisional electrodes DE adjacent to each other via the slit SL by forming the metal layer MLC in contact with one of the divisional electrodes DE and not in contact with the other of the divisional electrodes DE. The thickness of the metal layer MLC should preferably be, for example, less than or equal to 0.1 μm such that the light from a backlight, a reflector, etc. will not be reflected on the side surfaces of the metal layer MLC. Further, the metal layer MLC may be (at least partly) opposed to the source line Sj formed below the slit SL as shown in FIG. 6, and the metal layers ML including the metal layers MLC may be formed at regular intervals in the first direction X as shown in FIG. 6. Still further, the metal layer MLC may be formed to entirely cover the source line Sj or may be formed to partly cover the source line Sj. Still further, in planer view, the metal layer MLC may be symmetrical with respect to the central axis of the source line Sj (with respect to the boundary of sub-pixels SPX adjacent to each other in the first direction X) (such that the central axis of the source line Sj and the central axis of the metal layer MLC align with each other) as shown in FIG. 5, or may also be formed asymmetrically. Still further, the width of the metal layer MLC in the first direction X may be the same as the width of the metal layer ML in the first direction X, or the metal layer MLC may have a width less than that of the metal layer ML, for example, a width just enough to cover at least part of the source line Sj formed below the slit SL.

Now, the technical effect of the present embodiment will be described based on comparisons between the liquid crystal display device 1 of the present embodiment and the liquid crystal display device 100 having a cross-section structure of FIG. 7. Unlike the liquid crystal display device 1 of the present embodiment, the liquid crystal display device 100 of FIG. 7 includes no metal layer MLC in the slit SL but includes a conductive layer PEC of a common potential on a third insulating film 13 directly above the slit SL.

Figure 7:
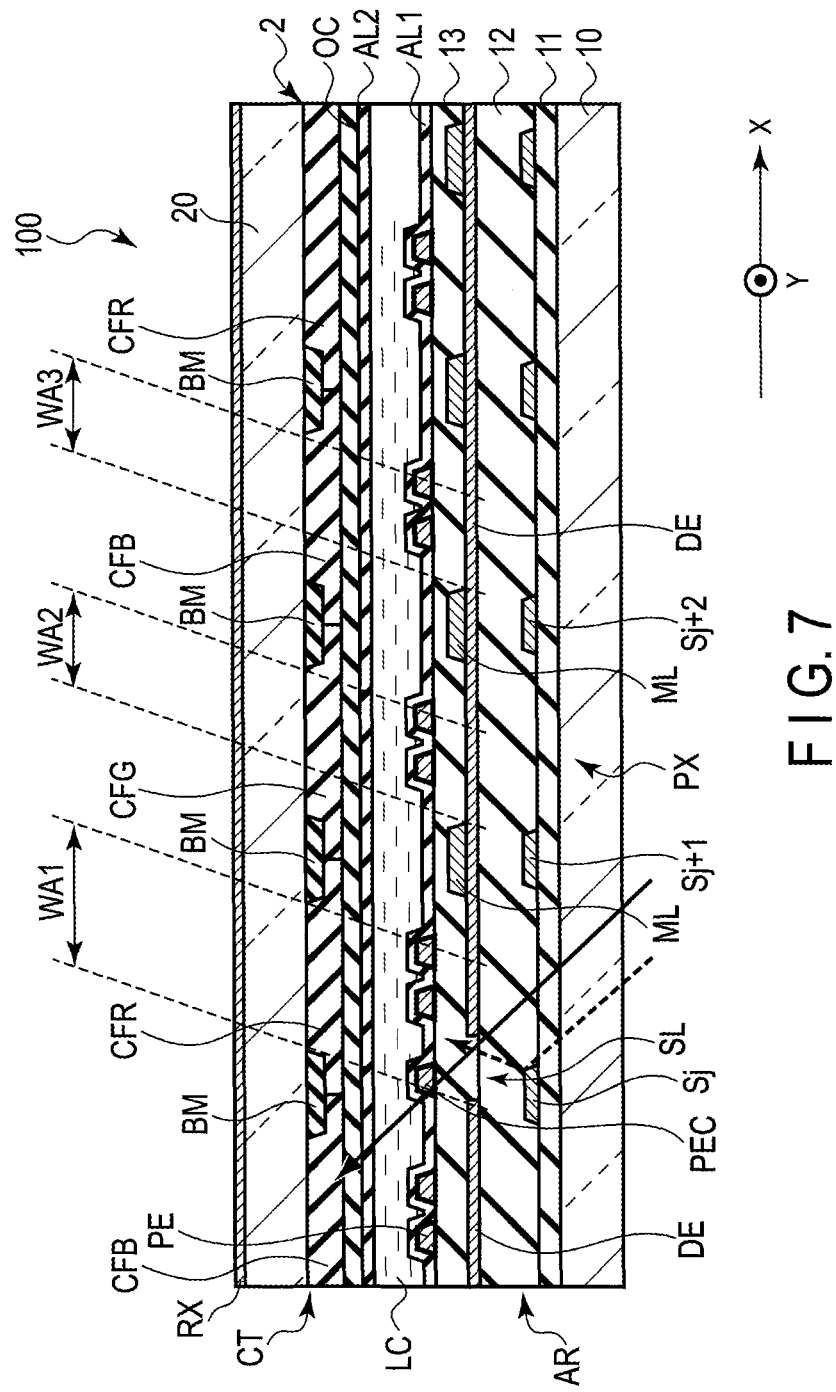
FIG. 7 is a sectional diagram showing a part of a liquid crystal display device as a comparative example of the liquid crystal display device of the first embodiment.

Here, assuming that the user views the screen from the right side of the structure of FIG. 7, since no metal layer MLC is formed in the slit SL of the liquid crystal display device 100 as described above, in the right divisional electrode DE of the two divisional electrodes DE adjacent to each other via the slit SL, the aperture width WA1 of the color filter CFR will be different from the aperture widths WA2 and WA3 of the color filters CFG and CFB. In this structure, since the aperture area of the color filter CFR is greater than the aperture areas of the color filters CFG and CFB, the light from the backlight, the reflector, etc. is transmitted more thorough the color filter CFR than through the other color filters CFG and CFB, and thus a color different from a desired color will be displayed, that is, the so-called color shift will occur.

Further, when the metal layer MLC is not formed in the slit SL in the liquid crystal display device 100 and if the light from the backlight, the reflector, etc., is reflected on the side surfaces of the source line formed below the slit SL, the reflected light cannot be blocked. In that case, as shown by a broken line arrow in FIG. 7, the reflected light is unnecessarily transmitted, for example, through the color filter CFR, and thus image contrast will decrease. Still further, when the metal layer MLC is not formed in the slit SL of the liquid crystal display device 100, some undesirable part of the light from backlight, reflector, etc. cannot be blocked, either. More specifically, for example, as shown by a solid line arrow in FIG. 7, there is a possibility that the light on the red color filter CFR side will be transmitted through the blue color filter CFB. In that case, the result of color mixings in the right and left visions will be deteriorated.

Still further, in proximity to the slit SL, when there is a potential difference between the source line S (source line Sj in FIG. 7) and the pixel electrode PE, an electric field is produced between the source line S and the pixel electrode PE, and part of the electric field may leak into the liquid crystal layer CL. If the electric field leaks into the liquid crystal layer LC, the liquid crystal molecules of the liquid crystal layer LC are misaligned, and this causes problems such as a crosstalk and a streak on a display image and degrades the display quality of the display.

In the example of FIG. 7, as described above, the metal layer MLC is not formed in the slit SL, but instead, the conductive layer PEC of a common potential and of a transparent conductive material the same as that of the pixel electrode PE is formed on the third insulating film 13 directly above the slit SL. In this structure, it is possible to prevent the leakage of the electric field produced between the source line Sj and the pixel electrode PE and eventually prevent a streak on the screen associated with the leakage of the electric field into the liquid crystal layer LC.

However, since the conductive layer PEC is formed of a transparent conductive material (for example, ITO, etc.) the same as that of the pixel electrode PE, unlike the metal layer MLC, the conductive layer PEC cannot block the reflected light or undesirable part of the light from the backlight, the reflector, etc. Therefore, it is difficult to prevent the above-described problems such as color shifts, decrease in image contrast, and degradation in the result of color mixings in the right and left visions.

Still further, in the case of forming the conductive layer PEC of a common potential on the third insulating film 13 directly above the slit SL, as shown in FIG. 8, it is necessary to form the conductive layer PEC in consideration of various distances and widths such as a width W1 of the slit SL, a width W2 of the conductive layer PEC, a distance M1 from the slit SL to the conductive layer PEC in the first direction X, a distance M2 from the slit SL to the pixel electrode PE in the first direction X, a distance M3 from the conductive layer PEC to the pixel electrode PE in the first direction X, etc. Therefore, for reasons of processing techniques, etc., the number of the slit PSL formed in the pixel electrode PE and the number of the comb teeth adjacent to each other via the slit PSL will be restricted accordingly. As a result, the undesirable effects of decreasing transmittance, creating a streak on the screen, etc. will be produced, and consequently the display quality of the liquid crystal display device will be degraded.

In contrast, according to the liquid crystal display device 1 of the present embodiment, the metal layer MLC is formed in the slit SL at the boundary of two divisional electrodes DE adjacent to each other in the first direction X, and thus the metal layer MLC can block an electric field produced between the source line Sj located below the slit SL and the pixel electrode PE located above the slit SL and thereby prevent the produced electric field from leaking into the liquid crystal layer LC, and can also block undesirable part of the light from the backlight, the reflector, etc., and thereby prevent the undesirable light from leaking into the color filters. Further, since the liquid crystal display device 1 of the present embodiment does not include the conductive layer PEC of the comparative example of FIG. 7, the number of the slit PSL formed in the pixel electrode PE will not be restricted.

Note that, in the liquid crystal display device 1 of the present embodiment, the pixel electrode PE is closer than the divisional electrode DE (drive electrode TX) to the liquid crystal layer LC as shown in FIG. 6. However, for example, even in a liquid crystal display where the divisional electrode DE (drive electrode TX) is closer than the pixel electrode PE to the liquid crystal layer LC, it is still possible to form the metal layer MLC in the slit SL portion and thereby achieve the above-described technical effect.

Second Embodiment

The second embodiment will be described below. Note that the present embodiment related to the case of forming the above-described metal layer MLC as well as the conductive layer PEC of FIGS. 9 and 10 will be described. In the following description, differences from the first embodiment will be mainly described, and structural elements the same as those of the first embodiment will be denoted by the same reference numbers and description thereof may be omitted.

Figure 10:
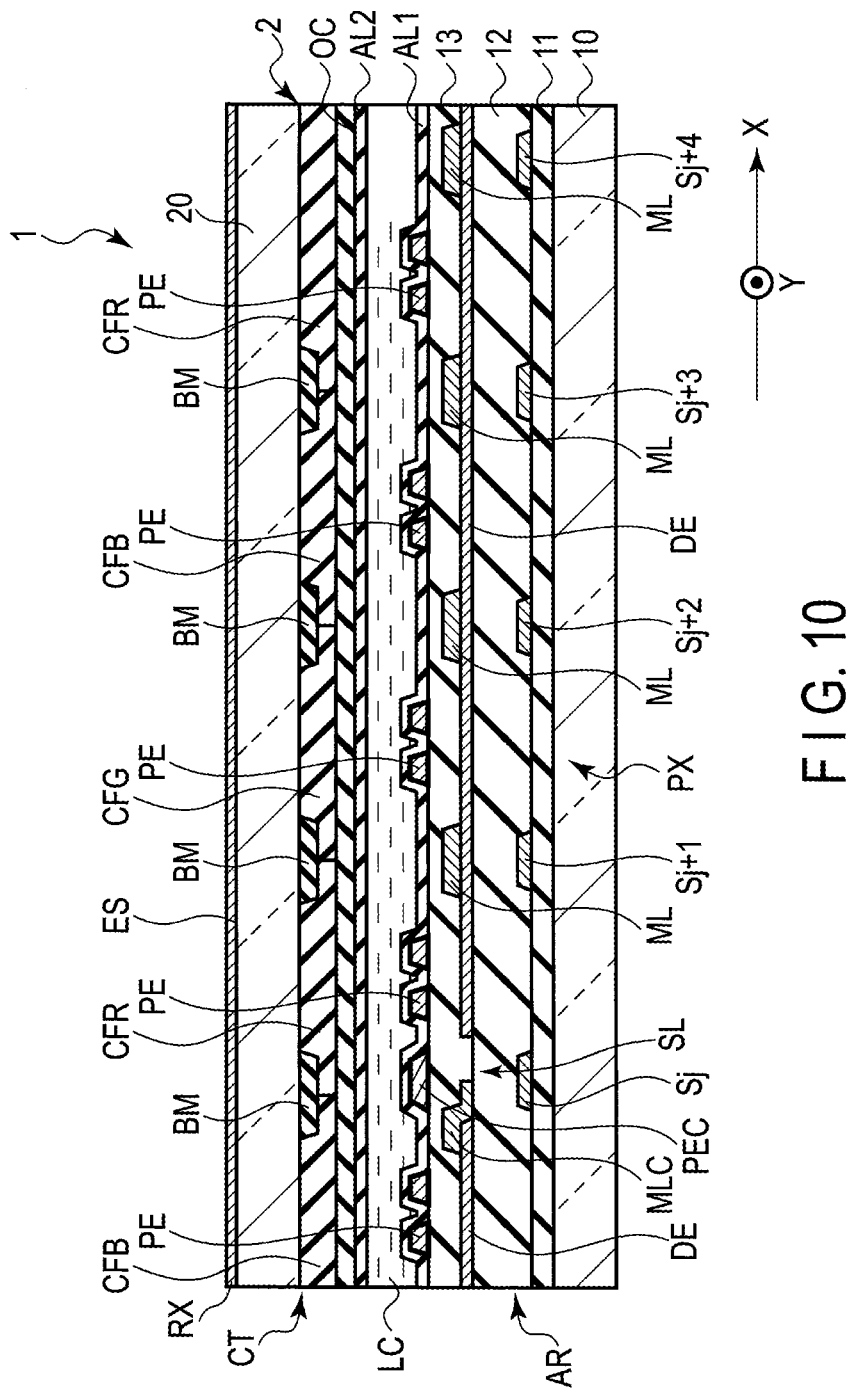
FIG. 10 is a sectional diagram showing a part of the liquid crystal display along line B-B' of FIG. 9.

FIG. 9 is a schematic plan view of parts of sub-pixels SPX in an array substrate AR of a liquid crystal display device 1 of the second embodiment as viewed from a counter-substrate CT side, and FIG. 10 is a sectional view of a part of the liquid crystal display device 1 along line B-B' of FIG. 9.

Note that, in the present embodiment, as shown in FIGS. 9 and 10, a metal layer MLC is formed asymmetrically with respect to the boundary of sub-pixels SPX adjacent to each other in the first direction X (that is, a metal layer MLC is formed to partly overlap a source line Sj). In this structure, since the metal layer MLC does not entirely overlap the source line Sj, an electric field produced between the source line Sj and a pixel electrode PE is not completely blocked by the metal layer MLC, and the produced electric field may leak into a liquid crystal layer LC and degrade the display quality of the liquid crystal display device 1.

Therefore, in the present embodiment, as shown in FIGS. 9 and 10, a conductive layer PEC of a common potential is further formed on a third insulating film 13 directly above the metal layer MLC. The conductive layer PEC is formed of, for example, a transparent conductive film of ITO, etc. According to the conductive layer PEC, even if the electric field produced between the source line Sj and the pixel electrode PE is not completely blocked by the metal layer MLC, the electric field will be blocked by the conductive layer PEC. Therefore, it is possible to prevent the electric field produced between the source line Sj and the pixel electrode PE from leaking into the liquid crystal layer LC more reliably.

According to the second embodiment, the electric field which cannot be blocked by the metal layer MLC can be blocked by the conductive layer PEC, and thus the leakage of the electric field to the liquid crystal layer LC can be prevented. In this way, a liquid crystal display having excellent display quality can be provided.

Third Embodiment

The third embodiment will be described below. Note that, in the present embodiment, a circuit provided in a liquid crystal display device 1 which has the structure of the first embodiment described above with reference to FIG. 6 or the structure of the second embodiment described above with reference to FIG. 10 and configured to operate in image display and touch detection using drive electrodes TX will be described. In the following descriptions, structural elements the same as those of the first and second embodiments will be denoted by the same reference numbers, and description thereof may be omitted in some cases.

FIG. 11 is a schematic diagram showing structural elements, etc. necessary for the image display and touch detection using the drive electrodes TX in the liquid crystal display device 1. The liquid crystal display device 1 of FIG. 11 further includes a first switch group SWG1, a second switch group SWG2, a third switch group SWG3, a fourth switch group SWG4, a fifth switch group SWG5, a first supply line 30 and a second supply line 40 in addition to the structural elements described in the above embodiments. Note that the third switch group SWG3 is included in the selector SD and is also referred to as a multiplexer.

For example, each of the switch groups SWG1 to SWG5 is formed in the liquid crystal display panel 2 where the array substrate AR and the counter-substrate CT are opposed to each other.

In the example of FIG. 11, the first switch group SWG1, the selector SD (third switch group SWG3) and the fourth switch group SWG4 are disposed between a first side E1 of the display area DA and an edge of the counter-substrate CT at the terminal area NA side shown in FIG. 1. Further, the second switch group SWG2 and the fifth switch group SWG5 are disposed between a second side E2 of the display area DA and an edge (upper edge in the drawing) of the display panel 2 shown in FIG. 1.

The first supply line 30 is subjected to a common voltage $V_{COM}$ for image display. The first supply line 30 extends from both sides of the driver IC 3 in the terminal area NA toward the first switch group SWG1. Further, the first supply line 30 is divided into branches and connected to the second switch group SWG2.

The second supply line 40 supplies a drive signal for touch detection. In the present embodiment, the second supply line 40 includes a low-voltage line 41 subjected to the first voltage $V_{TPL}$ and a high-voltage line 42 subjected to the second voltage $V_{TPH}$ higher than the first voltage $V_{TPL}$. The low-voltage line 41 and the high-voltage line 42 extend from both sides of the driver IC 3 in the terminal area NA toward the first switch group SWG1.

For example, the first supply line 30, the low-voltage line 41, and the high-voltage line 42 are connected to the touch detection IC 4 via the mounting terminal 5 and the first flexible printed circuit 6. The first supply line 30, the low-voltage line 41, and the high-voltage line 42 may be connected to the driver IC 3. The first switch group SWG1 switches the connection targets of the respective drive electrodes TX1 to TXn between the first supply line 30 and the second supply line 40 (the low-voltage line 41 or the high-voltage line 42).

The third switch group SWG3 and the driver IC 3 are connected to each other via a plurality of video lines VL. Each video line VL transmits an image signal supplied from the driver IC 3 to a pixel electrode PE of a sub-pixel SPX via a source line S formed in the display area DA.

The third switch group SWG3 distributes an image signal supplied from the driver IC 3 to the plurality of source lines S formed in the display area DA.

The first switch group SWG1 includes a plurality of first switches SW1 provided respectively for the drive electrodes TX1 to TXn. The first switch SW1 switches the connection target of the drive electrode TX between the first supply line 30 and the second supply line 40 (the low-voltage line 41 or the high-voltage line 42). More specifically, each first switch SW1 includes a common-voltage switch SWC which connects (turns on) or disconnects (turns off) the drive electrode TX and the first supply line 30 to or from each other, a low-voltage switch SWL which connects (turns on) or disconnects (turns off) the drive electrode TX and the low-voltage line 41 to or from each other, and a high-voltage switch SWH which connects (turns on) or disconnects (turns off) the drive electrode TX and the high-voltage line 42 to or from each other. The common-voltage switch SWC, the low-voltage switch SWL and the high-voltage switch SWH are all turned on or off by signals from the driver IC 3.

The second switch group SWG2 includes a plurality of second switches SW2 provided respectively for the drive electrodes TX1 to TXn. The second switch SW2 connects (turns on) or disconnects (turns off) the drive electrode TX and the first supply line 30 to or from each other. For example, the second switches SW2 are turned on or off under the control of the driver IC 3.

The third switch group SWG3 includes a plurality of third switches SW3 provided respectively for the source lines S formed in the display area DA. The third switch SW3 is provided at one end of the video line VL extending from the driver IC3, and connects (turns on) or disconnects (turns off) each source line S in the display area DA and the driver IC 3 to or from each other. For example, based on a control signal from the driver IC 3, the third switches SW3 are turned on or off such that an image signal supplied from the driver IC 3 via the video lines VL in a time-division manner is sequentially supplied to the respective source lines S.

The fourth switch group SWG4 includes a plurality of fourth switches SW4 provided respectively for the source lines S. The fourth switch SW4 connects (turns on) or disconnects (turns off) the source line S and the drive electrode TX to or from each other. For example, the fourth switches SW4 are turned on or off based on a control signal from the driver IC 3.

The fifth switch group SWG5 includes a plurality of fifth switches SW5 provided respectively for the source lines S. The fifth switch SW5 connects (turns on) or disconnects (turns off) the source line S and the drive electrode TX to or from each other. For example, the fifth switches SW5 are turned on or off based on a control signal from the driver IC 3.

Here, the state of each of the switch groups SWG1 to SWG5 in the touch detection period of detecting an object in contact with or in proximity to the display area DA will be described with reference to FIG. 11.

In the touch detection period, for example, a drive signal is sequentially supplied to the drive electrodes TX1 to TXn. When one drive electrode TX (hereinafter referred to as a drive target) is supplied with the drive signal, the corresponding first switch SW1 is set to a connection state different from that of the other drive electrodes TX.

In the example of FIG. 11, the drive electrode TX2 is assumed to be the drive target. The common-voltage switch SWC of the drive target, namely, the drive electrode TX2 is turned off, while the common-voltage switches SWC of the other drive electrodes TX are all maintained to be on. In the mean time, the second switches SW2 and the third switches SW3 are all turned off, and the fourth switches SW4 and the fifth switches SW5 are all turned on.

A connection target of the drive electrode TX2 as the drive target is swung between the low-voltage line 41 and the high-voltage line 42. That is, the low-voltage switch SWL and the high-voltage switch SWH of the drive electrode TX2 are alternately turned on and off, and a drive signal Stx that toggles between the first voltage $V_{TPL}$ and the second voltage $V_{TPH}$ is generated and supplied to the drive electrode TX2. Based on detection signals (the above-described detection signals Srx) obtained from detection electrodes RX1 to RXm in response to the drive signal Stx, the touch detection IC 4 detects the position of an object in contact with or in proximity to the display area DA.

Since the fourth switch SW4 and the fifth switch SW5 are turned on, each source line S is at the same potential as that of the drive electrode TX opposed to the source line S. In this way, it is possible to prevent formation of capacitance between the source line S and the drive electrode TX and thereby increase accuracy in touch detection. In the present embodiment, the drive electrode TX and the signal line S are connected to each other at both ends of the drive electrode TX and the source line S extending in the second direction Y, and therefore the drive electrode TX and the source line S can be entirely and stably set at the same potential.

In the touch detection period, the video lines VL between the driver IC 3 and the third switch group SWG3 are all floating, and this suppresses unnecessary formation of capacitance by the video lines VL. Note that, in the touch detection period, it is also possible to make all or some of the source lines S floating by turning off all or some of the fourth switches SW4 and the fifth switches SW5.

A drive electrode TX as a drive target may be selected sequentially from the drive electrode TX1 to the drive electrode TXn or may be selected in other orders. Further, a plurality of drive electrodes TX may be simultaneously selected as drive targets. Still further, each of the drive electrodes TX1 to TXn may be selected as a drive target once in a single touch detection period, or each of the drive electrodes TX1 to TXn may be selected as a drive target separately in two or more touch detection periods.

In the image display period, the common-voltage switches SWC of the first switches SW1, the second switches SW2 and the third switches SW3 are turned on, and the fourth switches SW4 and the fifth switches SW5 are turned off. In this way, the common voltage $V_{COM}$ is supplied to the drive electrodes TX1 to TXn. Further, an image signal is supplied from the driver IC 3 to the source lines S.

In the above-described circuit, regarding the source line S located in proximity to the slit SL, the connection target of the fourth switch SW4 and the fifth switch SW5 should preferably be one of two drive electrodes TX (divisional electrodes DE) adjacent to each other via the slit SL which has stronger capacitive coupling with the source line. If one drive electrode TX having weaker capacitive coupling with the source line S is determined as the connection target, in the touch detection period, noises associated with the drive signal Stx supplied to the one drive electrode TX will be mixed with the other drive electrode TX having stronger capacitive coupling with the source line S, and this leads to degradation in detection performance.

For example, in the example of FIGS. 5 and 6, in the source line Sj in proximity to the slit SL, the area opposed to the metal layer MLC and the divisional electrode DE in contact with the metal layer MLC is relatively great. Therefore, the source line Sj has stronger capacitive coupling with the drive electrode TX including this divisional electrode DE, and thus this drive electrode TX can be determined as the connection target of the fourth switch SW4 and the fifth switch SW5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, each slit SL formed in the display area DA is not necessarily formed at the boundary of the drive electrodes TX. That is, a plurality of divisional electrodes DE arranged in the first direction X may constitute the same drive electrode TX. For example, these divisional electrodes DE may be electrically connected to each other outside the display area DA or may be electrically connected to each other in the display area DA. In the slit SL formed between these divisional electrodes DE, the metal layer MLC may be formed in contact with both of the divisional electrodes DE adjacent to each other via the slit SL.

Further, the metal layer ML may also be formed below the divisional electrode DE, that is, between the divisional electrode DE and the second insulating film 12. In that case also, it is possible to obtain technical effects similar to those produced in the embodiments.

The detection electrodes RX may also be formed of a metal material. The detection electrodes RX may also be provided on the surface of the counter-substrate CT at the liquid crystal side or may even be provided on the array substrate AR. In the case of forming a detection electrode RX of a transparent conductive film on the array substrate AR, the embodiments are also applicable to this detection electrode RX. Further, in the case of applying the embodiments to an IDLED, it is possible to apply the technical structures of the embodiments to the cathode electrode of the OELD without any restrictions.

What is claimed is:

1. A liquid crystal display device comprising:
a first substrate comprising a gate line extending in a first direction, a plurality of signal lines extending in a second direction, an interlayer insulating film covering the gate line and the signal lines, and a first common electrode and a second common electrode formed on the interlayer insulating film and divided from each other by a slit formed along a signal line;
a second substrate opposed to the first substrate; and
a liquid crystal layer enclosed between the first substrate and the second substrate, wherein
the first substrate comprises a first metal layer and a second metal layer extending in the second direction,
each of the first metal layer and the second metal layer has a first edge and a second edge arranged in the first direction,
the second edge is opposed to the first edge,
the first edge of the first metal layer is in contact with the first common electrode,
the second edge of the first metal layer is in contact with the interlayer insulating film at a part of the slit and not in contact with the second common electrode,
the first edge and the second edge of the second metal layer are in contact with the second common electrode,
a first signal line is one of the plurality of signal lines, and is located in correspondence with the slit,
the first edge of the first metal layer is not opposed to the first signal line,
the second edge of the first metal layer is opposed to the first signal line, and
in a plan view,
the first metal layer has a break portion,
the break portion overlaps with the gate line, and
the second metal layer overlaps with the gate line.

2. The liquid crystal display device of claim 1, wherein the second substrate further comprises:
a light-blocking layer defining pixels; and
a spacer projecting through the liquid crystal layer where the spacer overlaps the light-blocking layer, wherein
the spacer is in contact with the first substrate where the spacer overlaps the first signal line opposed to the first metal layer, and
the spacer is in contact with the first substrate at a region where the break portion is formed.

3. The liquid crystal display device of claim 2, wherein the first substrate further comprises:
a plurality of pixel electrodes opposed to the first common electrode and the second common electrode; and
a conductive layer formed in the same layer as the pixel electrode and of the same material as that of the pixel electrode and covering at least a part of the slit,
a first edge of the conductive layer overlaps with the first metal layer,
a second edge of the conductive layer does not overlap with the first metal layer, and
the spacer overlaps with the conductive layer.

4. The liquid crystal display device of claim 1, further comprising:
a driver selectively supplying the first common electrode and the second common electrode with a voltage to display an image in a display area or a drive signal to detect an object in proximity to the display area;
a detection electrode opposed to one of the first common electrode and the second common electrode; and
a detector detecting the object in proximity to the display area based on signals obtained from the detection electrodes when the drive signal is supplied to the first common electrode and the second common electrode.

5. The liquid crystal display device of claim 1, further comprising a switch connecting the first signal line and one of the first common electrode and the second common electrode to each other, wherein
the first signal line arranged in proximity to the slit is connected by the switch to one of the first common electrode and the second common electrode adjacent to each other via the slit which has stronger capacitance coupling with the first signal line.

6. The liquid crystal display device of claim 3, wherein a width of the second metal layer in the first direction is larger than a width of a second signal line which is one of the plurality of signal lines and overlaps with the second metal layer in the first direction.

7. A liquid crystal display device comprising:
a first substrate comprising a gate line extending in a first direction, a plurality of signal lines extending in a second direction crossing the first direction, and first common electrode and a second common electrode divided from each other by a slit formed along a signal line;
a second substrate opposed to the first substrate and comprising a light-blocking layer defining pixels; and
a liquid crystal layer enclosed between the first substrate and the second substrate, wherein
the first substrate comprises a first metal layer and a second metal layer extending in the second direction,
each of the first metal layer and the second metal layer has a first edge and a second edge arranged in the first direction,
the first edge of the first metal layer is in contact with the first common electrode,
the second edge of the first metal layer, which is opposed to the first edge of the first metal layer in the first direction, is in contact with the interlayer insulating film at a part of the slit and not in contact with the second common electrode,
the first edge and the second edge of the second metal layer are in contact with the second common electrode,
the second substrate comprises a spacer projecting through the liquid crystal layer and the gate line where the spacer overlaps the light-blocking layer,
the spacer is in contact with the first substrate where the spacer overlaps with the signal line located in correspondence with the slit,
the first metal layer is not formed where the spacer is in contact with the first substrate,
a part of the first metal layer overlaps with the gate line,
another part of the first metal layer does not overlap with the gate line, and
the second metal layer overlaps with the gate line.

8. The liquid crystal display device of claim 7, wherein the first substrate further comprises:
a plurality of pixel electrodes opposed to the first common electrode and the second common electrode; and
a conductive layer formed in the same layer as the pixel electrode and of the same material as that of the pixel electrode and covering at least a part of the slit,
a first edge of the conductive layer overlaps with the first metal layer,
a second edge of the conductive layer does not overlap with the first metal layer, and
the spacer overlaps with the conductive layer.

9. The liquid crystal display device of claim 7, further comprising:
a driver selectively supplying the first common electrode and the second common electrode with a voltage to display an image in a display area or a drive signal to detect an object in proximity to the display area;
a detection electrode opposed to one of the first common electrode and the second common electrode; and
a detector detecting the object in proximity to the display area based on signals obtained from the detection electrodes when the drive signal is supplied to the first common electrode and the second common electrode.

10. The liquid crystal display device of claim 7, further comprising a switch connecting the first signal line and one of the first common electrode and the second common electrode to each other, wherein
the first signal line arranged in proximity to the slit is connected by the switch to one of the first common electrode and the second common electrode adjacent to each other via the slit which has stronger capacitance coupling with the first signal line.

11. A liquid crystal display device comprising:
a first substrate comprising a plurality of signal lines, a first common electrode and a second common electrode divided from each other by slits a slit formed along a signal line, a plurality of pixel electrodes opposed to the first common electrode and the second common electrode, and a conductive layer formed in the same layer as and of the same material as that of the pixel electrode and covering at least a part of the slit;
a second substrate opposed to the first substrate; and
a liquid crystal layer enclosed between the first substrate and the second substrate, wherein
the first substrate comprises a first metal layer and a second metal layer,
a first edge of the first metal layer is in contact with the first common electrode,
a second edge of the first metal layer, which is opposed to the first edge of the first metal layer in the first direction, is in contact with the interlayer insulating film at a part of the slit and not in contact with the second common electrode,
a first edge and a second edge of the second metal layer are in contact with the second common electrode,
a first edge of the conductive layer overlaps with the first metal layer, and
a second edge of the conductive layer does not overlap with the first metal layer.

12. The liquid crystal display device of claim 11, wherein
at least one of the signal lines is located in correspondence with the slit,
the first metal layer is at least partly opposed to the signal line located in correspondence with the slit,
the second edge of the first metal layer overlaps with the signal line, and
the first edge of the first metal layer does not overlap with the signal line.

13. The liquid crystal display device of claim 11, further comprising:
a driver selectively supplying the first common electrode and the second common electrode with a voltage to display an image in a display area or a drive signal to detect an object in proximity to the display area;
a detection electrode opposed to one of the first common electrode and the second common electrode; and
a detector detecting the object in proximity to the display area based on signals obtained from the detection electrodes when the drive signal is supplied to the first common electrode and the second common electrode.

14. The liquid crystal display device of claim 11, further comprising a switch connecting the first signal line and the first common electrode and the second common electrode to each other, wherein
the first signal line arranged in proximity to the slit is connected by the switch to one of the first common electrode and the second common electrode adjacent to each other via the slit which has stronger capacitance coupling with the first signal line.

* * * * *